(12) United States Patent
Pan et al.

(10) Patent No.: US 12,730,715 B2
(45) Date of Patent: Sep. 8, 2026

(54) SELECTIVE CODEWORD MEDIA SCAN SYSTEM

(71) Applicant: MICRON TECHNOLOGY, INC., Boise, ID (US)

(72) Inventors: Wen Pan, Santa Clara, CA (US); Yang Liu, Melissa, TX (US); Seungjune Jeon, Santa Clara, CA (US); Wei Wang, Dublin, CA (US); Charles S. Kwong, Redwood City, CA (US); Jiangli Zhu, San Jose, CA (US); Juane Li, Milpitas, CA (US)

(73) Assignee: MICRON TECHNOLOGY, INC., Boise, ID (US)

(*) Notice: Subject to any disclaimer, the term of this patent is extended or adjusted under 35 U.S.C. 154(b) by 56 days.

(21) Appl. No.: 18/812,552

(22) Filed: Aug. 22, 2024

(65) Prior Publication Data

US 2026/0056837 A1 Feb. 26, 2026

(51) Int. Cl.
*G06F 11/00* (2006.01)
*G06F 11/10* (2006.01)

(52) U.S. Cl.
CPC ...... *G06F 11/1068* (2013.01); *G06F 11/1016* (2013.01)

(58) Field of Classification Search
CPC .. G06F 11/1068; G06F 11/1016; G06F 11/30; G06F 11/16
See application file for complete search history.

(56) References Cited

U.S. PATENT DOCUMENTS

| | | | | |
|---|---|---|---|---|
| 8,516,343 | B2 * | 8/2013 | Flynn | G11C 29/88 714/773 |
| 8,638,602 | B1 * | 1/2014 | Horn | G06F 11/1072 365/185.11 |
| 9,483,340 | B1 * | 11/2016 | Johnson | G06F 11/076 |
| 9,536,563 | B1 * | 1/2017 | Liu | G06F 11/1469 |
| 10,025,526 | B2 * | 7/2018 | Chiang | G06F 3/0611 |
| 10,191,799 | B2 * | 1/2019 | Karlik | G06F 11/0727 |
| 10,302,695 | B2 * | 5/2019 | Kumar | G11C 29/10 |
| 10,423,345 | B2 * | 9/2019 | d'Abreu | G06F 11/08 |

(Continued)

OTHER PUBLICATIONS

WOISR: Notification of Transmittal of the International Search Report and the Written Opinion of the International Searching Authority, or the Declaration mailed Nov. 19, 2025 for corresponding PCT/US2025/038620.

*Primary Examiner* — Esaw T Abraham
(74) *Attorney, Agent, or Firm* — Tarolli, Sundheim, Covell & Tummino LLP

(57) ABSTRACT

A method for performing a media scan operation in a memory device is described herein. The method includes initiating the media scan operation via a controller. The method also includes selecting one or more codewords that is a proper subset of a plurality of codewords in a page of memory via the controller. The method also includes determining a bit error count (BEC) of each of the one or more codewords via the controller. The method also includes comparing the BEC of each of the one or more codewords with a BEC threshold via the controller. The method further includes determining the BEC of each of the codewords of the page of memory via the controller in response to the BEC of one or more of the selected set of codewords being greater than the BEC threshold.

10 Claims, 5 Drawing Sheets

(56) References Cited

U.S. PATENT DOCUMENTS

| | | | |
|---|---|---|---|
| 11,188,416 B2 * | 11/2021 | Cadloni | G06F 3/0673 |
| 2015/0286528 A1 | 10/2015 | Cai et al. | |
| 2017/0068580 A1 | 3/2017 | Johnson et al. | |
| 2019/0354299 A1 * | 11/2019 | Liikanen | G06F 3/064 |
| 2020/0365228 A1 | 11/2020 | Cadloni et al. | |
| 2022/0035697 A1 | 2/2022 | Lu et al. | |
| 2022/0180962 A1 | 6/2022 | Cadloni et al. | |
| 2024/0062839 A1 | 2/2024 | Wang et al. | |

* cited by examiner

SELECTIVE CODEWORD MEDIA SCAN SYSTEM

TECHNICAL FIELD

This disclosure relates to memory devices, and particularly to a selective codeword media scan system.

BACKGROUND

Memory devices are widely used to store information in various electronic devices. A memory device includes memory cells. A memory cell is an electronic circuit capable of being programmed to a data state of two or more data states. For example, a memory cell may be programmed to a data state that represents a single binary value, often denoted by a binary "1" or a binary "0." As another example, a memory cell may be programmed to a data state that represents a fractional value (e.g., 0.5, 1.5, or the like). To store information, the electronic device may write to, or program, a set of memory cells. To access the stored information, the electronic device may read, or sense, the stored state from the set of memory cells. However, in response to multiple accesses of memory cells (reading data from and/or writing data to the memory cells), the quality of the memory cells for accurately storing data (e.g., without bit errors) can be degraded.

DETAILED DESCRIPTION

Figure 1A:
FIG. 1A illustrates a system for decoding data from a memory sub-system.
Figure 1A:
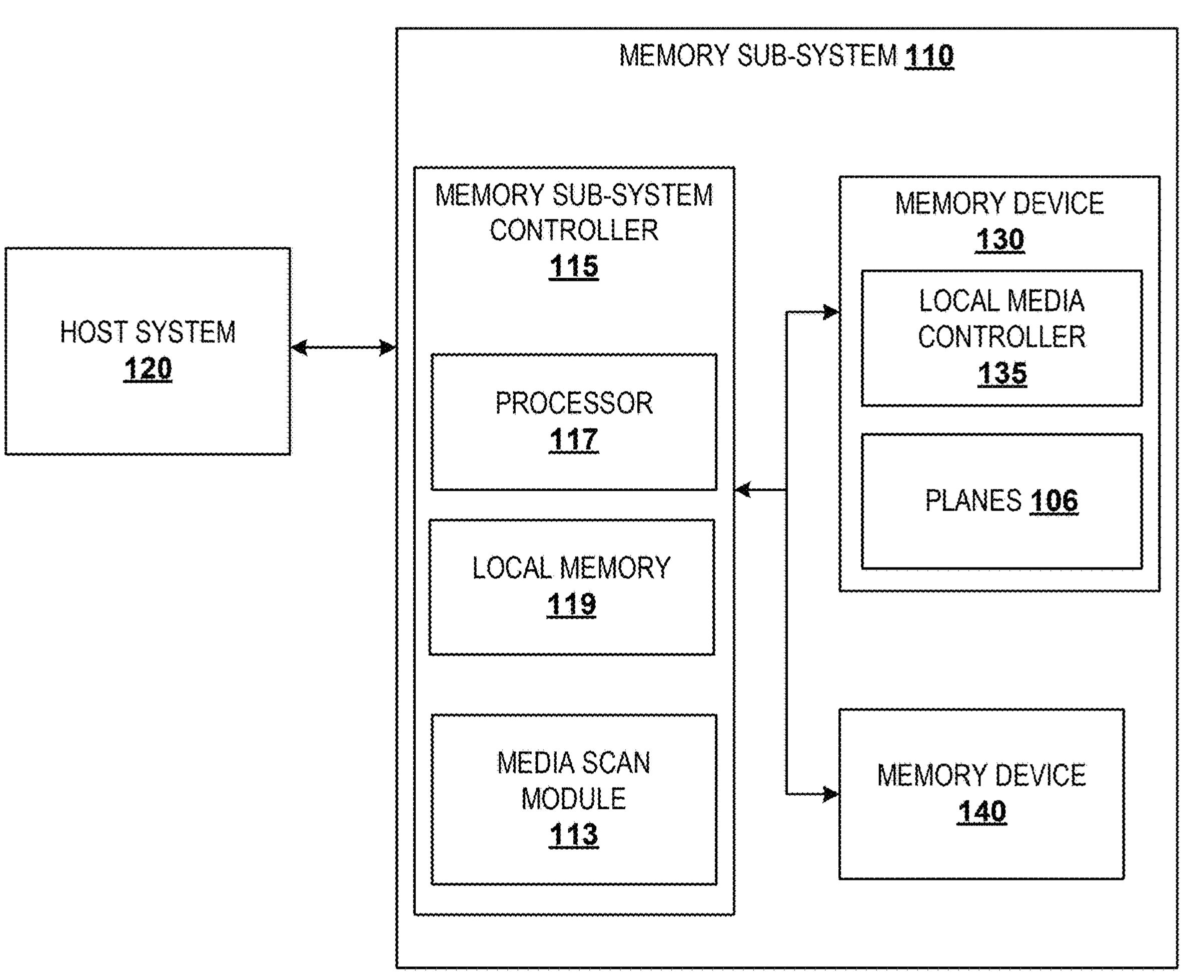

This disclosure relates to memory devices, and particularly to a selective codeword media scan system. A manner of performing a media scan on codewords of a page of memory is described herein. As described herein, to provide a media scan (e.g., also referred to herein and elsewhere as "media scan" or "reliability scan"), a set (e.g., one or more) of codewords that are a proper subset of all of the codewords of the page of the memory is selected for the media scan operation of the page of the memory to determine a bit error count (BEC) of the selected set of codewords. As described herein, the term "proper subset" refers to a quantity of a set that is less than all of the entire set. Therefore, the media scan operation can be performed on less than all of the codewords in a given page of the memory. Because the media scan operation can be performed on a set of one or more codewords that is a proper subset of the codewords of a page of memory, media scan operations can be performed in a more rapid manner than media scan operations that are performed on all codewords of the page of the memory.

As an example, during a media scan operation, an associated controller can determine a BEC of the selected codeword(s), and the controller can compare the BEC of each of the codeword(s) to a BEC threshold. The controller can then determine if the data in at least the page of the memory should be folded in response to the BEC of the codeword(s) exceeding the BEC threshold. As described herein, the term "fold" with respect to data refers to relocating the data from a first location in a memory device to a different more reliable location in the memory device. As an example, the BEC threshold can be a first BEC threshold, such that the controller can compare the BEC of all of the codewords in the page of the memory with the second BEC threshold in response to the BEC of one or more of the codeword(s) exceeding the first BEC threshold. Additionally, the controller can implement a deep check of the page of the memory in response to the BEC of one or more of the codeword(s) exceeding the BEC threshold (e.g., all of the codewords exceeding the second BEC threshold). In some implementations, the term "deep check" is also or alternatively referred to as "valley health check (VHC)."

As an example, a deep check can refer to a determination of a plot of raw bit error rate (RBER) as a function of a voltage offset from a calibrated read voltage. The plot can thus take the form of a parabolic plot that resembles a valley. The controller can determine and analyze characteristics of the valley to determine if the data should be folded. The characteristics of the valley can include width and floor of the valley, as plotted based on variation of the RBER relative to the offset from the calibration read voltage. The controller can thus determine if the data should be folded based on a comparison of the characteristics of the valley with predetermined thresholds.

A memory sub-system refers to a storage device, a memory module or some combination thereof. The memory sub-system includes a memory device or multiple memory devices that store data. The memory devices could be volatile or non-volatile memory devices. Some examples of a memory sub-system include high density non-volatile memory devices where retention of data is desired during intervals of time where no power is supplied to the memory device. One example of a non-volatile memory device is a not-AND (NAND) memory device. A non-volatile memory device is a package that includes a die(s). Each such die can include a plane(s). For some types of non-volatile memory devices (e.g., NAND memory devices), each plane includes a set of physical blocks, and each physical block includes a set of pages. Each page includes a set of memory cells, which are commonly referred to as cells. A cell is an electronic circuit that stores information. A cell stores one or more bits of binary information and has various logic states that correlate to the number of bits being stored. The logic states are represented by binary values, such as '0' and '1', or as combinations of such values, such as '00', '01', '10' and '11'.

A memory device includes multiple cells arranged in a two-dimensional or a three-dimensional array. In some examples, memory cells are formed on a silicon wafer in an array of columns connected by conductive lines (also referred to as bitlines, or BLs) and rows connected by conductive lines (also referred to as wordlines or WLs). A wordline is a row of associated memory cells in a memory device that are used with a bitline or multiple bitlines to generate the address of each of the memory cells. The intersection of a bitline and a wordline defines an address of a given memory cell.

A block refers to a unit of the memory device used to store data. In various examples, the unit could be implemented as a group of memory cells, a wordline group, a wordline or as individual memory cells. Multiple blocks are grouped together to form separate partitions (e.g., planes) of the memory device to enable concurrent operations to take place on each plane. A solid-state drive (SSD) is an example of a memory sub-system that includes a non-volatile memory device(s) and a memory sub-system controller to manage the non-volatile memory devices.

When data is stored in memory, certain algorithms can detect and correct a number of errors in the stored data. Error correction code (ECC) encodes data in such a way that errors in the data can be identified and corrected when the data is decoded. For example, data strings can be encoded by an ECC encoder by adding a number of redundant and/or parity bits to create corresponding codewords. When an original data string is to be retrieved from the memory, an ECC decoder can use the corresponding codewords to identify bit errors in the encoded data string. If bit errors are present, one or more ECC operations can be employed to correct the bit errors and to recover the original data string. In addition to outputting error-checked and/or error-corrected data, some implementations of the ECC can also generate metadata regarding an ECC decode operation.

As described herein, a memory sub-system can generate quality metrics corresponding to an ECC operation. The quality metrics can be generated and collected in a media scan of the memory device, and not only when a memory device is performing a host-initiated read operation. The media scan can involve read and ECC operations that iteratively generate quality metrics corresponding to memory regions in a memory device to build up a data set that can illustrate the health of the device. As an example, the media scan operation can run in the background of a memory system and/or device (e.g., as a background scan periodically and/or during idle periods in which the memory system and/or the memory device is not performing other operations in response to a host-initiated command). In other examples, a media scan operation can be performed as a foreground operation of a memory system and/or device (e.g., in response to a host-initiated command or according to a predetermined schedule).

The media scan operation can iteratively read a number of pages in each memory region. During the scan, problematic and/or unreliable memory regions (e.g., memory regions with a high bit error count and/or a low margin to failure) can be identified (e.g., before a memory region fails and/or enters redundant array of independent NAND (RAIN) recovery) and can be refreshed and/or retired. In some examples, a media scan operation can classify a memory region as unreliable based at least in part on quality metrics generated while decoding codewords saved to the memory region. For example, comparing a codeword's BEC to a defined codeword BEC threshold can provide an indication of whether the memory region saving the codeword is reliable (e.g., even though an original data string corresponding to the codeword can currently be reconstructed and/or recovered). In these and other examples, the quality metrics generated while decoding a codeword and/or statistical information corresponding thereto can be saved (e.g., for analysis of the memory system and/or device, for use in other error avoidance ECC operations, etc.). In these and still other examples, a log of refreshed and/or retired memory regions can be saved and/or maintained (e.g., for analysis of the memory system and/or device).

In this manner, memory systems and/or devices with media scan capability can proactively identify least capable memory regions within the systems and/or devices to prevent them from becoming a trigger rate problem and/or causing an uncorrectable ECC event. Thus, memory systems and/or devices with media scan capability are expected to mitigate outlier BEC tail surprises that may be exacerbated by NAND die intolerance to retention, read disturb, cross-temperature, and/or defects. The memory systems and/or devices are also expected to save and/or provide valuable information regarding the health and/or quality of the systems and/or devices.

To perform a media scan operation, the memory sub-system controller can nominally iteratively scan each of the codewords of a given page of memory to determine the BEC of each of the codewords. Thus, the BEC of each of the codewords can be compared with a BEC threshold. If the BEC of one or more of the codewords of the page exceeds the BEC threshold, then the memory sub-system controller can fold the data to a different location in the memory device. However, the health of a given physical location of memory can be substantially consistent within a group of proximal locations, particularly if the memory locations are logically connected (e.g., part of the same page, sub-block, or block). Therefore, if a given codeword fails a media scan operation and is deemed unreliable (e.g., by having a BEC that exceeds the BEC threshold), then it is likely that the other codewords of the respective page of memory are likewise unreliable.

Based on the related reliability of groups of codewords, as described herein, the media sub-system controller can be configured to only scan a set of one or more codewords of a given page as a proper subset of all the codewords of the page. A determination of the reliability of the proper subset of the codeword(s) can thus be indicative of a reliability of the entire page, which can prompt further scanning. As a result, by performing a media scan on less than all of the codewords of a given page during a media scan operation, the memory sub-system controller can significantly reduce the amount of time and processing resources on performing a media scan operation on the memory device.

FIG. 1A illustrates a system 100 that includes a memory sub-system 110 that can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card and a hard disk drive (HDD). Examples of memory modules include a dual in-line memory module (DIMM), a small outline DIMM (SO-DIMM) and various types of non-volatile dual in-line memory modules (NVDIMMs).

The system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment or a networked commercial device) or such computing device that includes memory and a processing device. The system 100 can include a host system 120 that is coupled to one or more memory sub-systems 110. In some examples, the host system 120 is coupled to different types of the memory sub-system 110. FIG. 1A illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller, CXL controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a compute express link (CXL) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., memory device(s) 130) when the memory sub-system 110 is coupled with the host system 120 by the physical host interface (e.g., PCIe or CXL bus). The physical host interface can provide an interface for passing control, address, data and other signals between the memory sub-system 110 and the host system 120. FIG. 1A illustrates a memory sub-system 110 as an example. In general, the host system 120 can access multiple memory sub-systems via a same communication connection, multiple separate communication connections and/or a combination of communication connections.

The memory device 130 and the memory device 140 are implemented as non-transitory computer readable media. The memory device 130 and the memory device 140 can include any combination of the different types of non-volatile memory devices and/or volatile memory devices. The volatile memory devices (e.g., the memory device 140) can be, but are not limited to, random access memory (RAM), such as dynamic random access memory (DRAM) and synchronous dynamic random access memory (SDRAM).

Some examples of non-volatile memory devices (e.g., memory device(s) 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory device(s) 130 include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) or higher, can store multiple bits per cell. In some examples, each of the memory device(s) 130 can include one or more arrays of memory cells such as SLCs, MLCs, TLCs, QLCs or some combination thereof. In some examples, a particular memory device can include an SLC portion, an MLC portion, a TLC portion and/or a QLC portion of memory cells. The memory cells of the memory device(s) 130 can be grouped as pages that can refer to a logical unit of the memory device used to store data. In some types of memory (e.g., NAND), pages can be grouped to form blocks. The blocks can include sub-blocks and can be organized across a set of planes 106 of the memory device 130.

A "page" of memory (or "a memory page") may refer to a group of memory cells connected to a same access line. In some implementations (e.g., for single-level cells), the memory cells connected to an access line may be associated with a single page of memory. In some implementations (e.g., for multi-level cells), the memory cells connected to an access line may be associated with multiple pages of memory, where each page represents one bit stored in each of the memory cells (e.g., a lower page that represents a first bit stored in each memory cell and an upper page that represents a second bit stored in each memory cell). In NAND memory, a page is the smallest physically addressable data unit for a write operation (e.g., a programming operation).

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide-based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, electrically erasable programmable read-only memory (EEPROM), etc.

A memory sub-system controller 115 (or controller 115 for simplicity) communicates with the memory device(s) 130 to perform operations such as reading data, writing data or erasing data at the memory device(s) 130 and other such operations. The memory sub-system controller 115 can include hardware such as one or more integrated circuits and/or discrete components, a buffer memory or some combination thereof. The hardware can include a digital circuitry with dedicated (e.g., hard-coded) logic to perform the operations described herein. The memory sub-system controller 115 can be a microcontroller, special purpose logic circuitry (e.g., a field programmable gate array (FPGA), an application specific integrated circuit (ASIC), etc.) or another suitable processor.

The memory sub-system controller 115 can include a processing device, which includes one or more processors (e.g., the processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. The local memory 119 is a non-transitory computer-readable medium.

In some examples, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another example, a memory sub-system 110 does not include a memory sub-system controller 115 and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device(s) 130. The memory sub-system controller 115 can be responsible for other operations such as wear leveling operations, garbage collection operations, error detection and error-correcting code (ECC) operations, encryption operations, caching operations and address translations between a logical address (e.g., a logical block address (LBA), namespace) and a physical address (e.g., physical block address) that are associated with the memory device(s) 130. The memory sub-system controller 115, for example, may employ a Flash Translation Layer (FTL) to translate logical addresses to corresponding physical memory addresses, which can be stored in one or more FTL mapping tables. In some instances, the FTL mapping table can be referred to as a logical-to-physical (L2P) mapping table storing L2P mapping information. The memory sub-system controller 115 can further include host interface circuitry to communicate with the host system 120 via the physical host interface. The host interface circuitry can convert the commands received from the host system into command instructions to access the memory device(s) 130 as well as convert responses associated with the memory device(s) 130 into information for the host system 120.

The memory sub-system 110 can also include additional circuitry or components that are not illustrated. For example, the memory sub-system 110 can include a cache or buffer (e.g., DRAM) and address circuitry (e.g., a row decoder and a column decoder) that can receive an address from the memory sub-system controller 115 and decode the address to access the memory device(s) 130.

In some examples, the memory device(s) 130 includes local media controllers 135 that operate in concert with the memory sub-system controller 115 to execute operations on one or more memory cells of the memory device(s) 130. An external controller (e.g., the memory sub-system controller 115) can externally manage the memory device 130 (e.g., perform media management operations on the memory device 130). In some examples, the memory sub-system 110 is a managed memory device, which is a raw memory device 130 having control logic (e.g., local media controller 135) on the die and a controller (e.g., the memory sub-system controller 115) for media management within the same memory device package. An example of a managed memory device is a managed NAND (MNAND) device.

In operation, the host system 120 manages and controls the flow of data between itself and the memory sub-system 110, ensuring efficient data storage and retrieval operations. More generally, the host system 120 employs the memory sub-system 110 to write data to and read data from the memory sub-system 110. For instance, the host system 120 processes these request for reading and/or write data by interacting with the memory sub-system 110, managing the flow of data to and from the memory device 130 and/or the memory device 140 within the memory sub-system 110. This reading and writing of data enables operation of computing systems where data access and management is needed.

In various examples, the memory sub-system 110 includes a media scan module 113 that can periodically execute media scan operations on the memory device 130 to monitor the health of the memory device 130 and the reliability of the data stored therein. In some examples, the memory sub-system controller 115 includes at least a portion of the media scan module 113. In some examples, the media scan module 113 is part of the host system 120, an application or an operating system. In other examples, local media controller 135 includes a portion of the media scan module 113 and is configured to perform the functionality described herein.

As described herein, to provide a media scan operation, the media scan module 113 can select a set of one or more codewords that are a proper subset of a page of the memory device 130 for the media scan of the respective page of the memory device 130 to determine the bit error count (BEC) of the selected set of codewords. Therefore, the media scan operation can be performed on less than all of the codewords in the given page of the memory device 130. Because the media scan module 113 scans less than all of the codewords of a page of the memory device 130 during a media scan operation, the media scan operation can be performed in a more rapid manner than a media scan operation that is performed on all codewords of the page of the memory device 130.

As an example, during a media scan operation, the media scan module 113 can determine a BEC of the selected codeword(s). The media scan module 113 can then compare the BEC of each of the codeword(s) to a BEC threshold. As one example, the media scan module 113 can determine that the data in the page (e.g., a block or block stripe that includes the page) should be folded based on the one or more of the selected codeword(s) having a BEC that is greater than the BEC threshold. As another example, the media scan module 113 can implement a deep check (e.g., valley health check) in response to the one or more of the selected codeword(s) having a BEC that is greater than the BEC threshold.

As yet another example, the BEC threshold described above can be a first BEC threshold. If any of the selected codeword(s) have a BEC that exceeds the first BEC threshold, the media scan module 113 can determine that the data in the page may be unreliable. In response to such a determination, the media scan module 113 can compare the BEC of all of the codewords in the page of the memory device 130 with a second BEC threshold. As an example, the second BEC threshold can be greater than the first BEC threshold. In response to the BEC of one or more of the codewords of the page exceeding the second BEC threshold, the media scan module 113 can implement a deep check of the page of the memory device 130.

For example, the deep check can be determinative of the health of the page of the memory device 130, or of a portion of the memory device 130 that includes the page. If the deep check passes, then the media scan module 113 can determine that the page and/or portion of the memory device 130 is still suitable for storing data. If the deep check fails, the media scan module 113 can determine that the page or the portion of the memory device 130 that the includes the page is unsuitable for storing data. Therefore, the media scan module 113 can fold the data in the page and/or the portion of the memory device 130 to another location in the memory device 130 to preserve the integrity of the data. As an example, the media scan module 113 can fold a block stripe of the memory device 130 that includes the page in response to failure of the deep check.

Figure 1B:
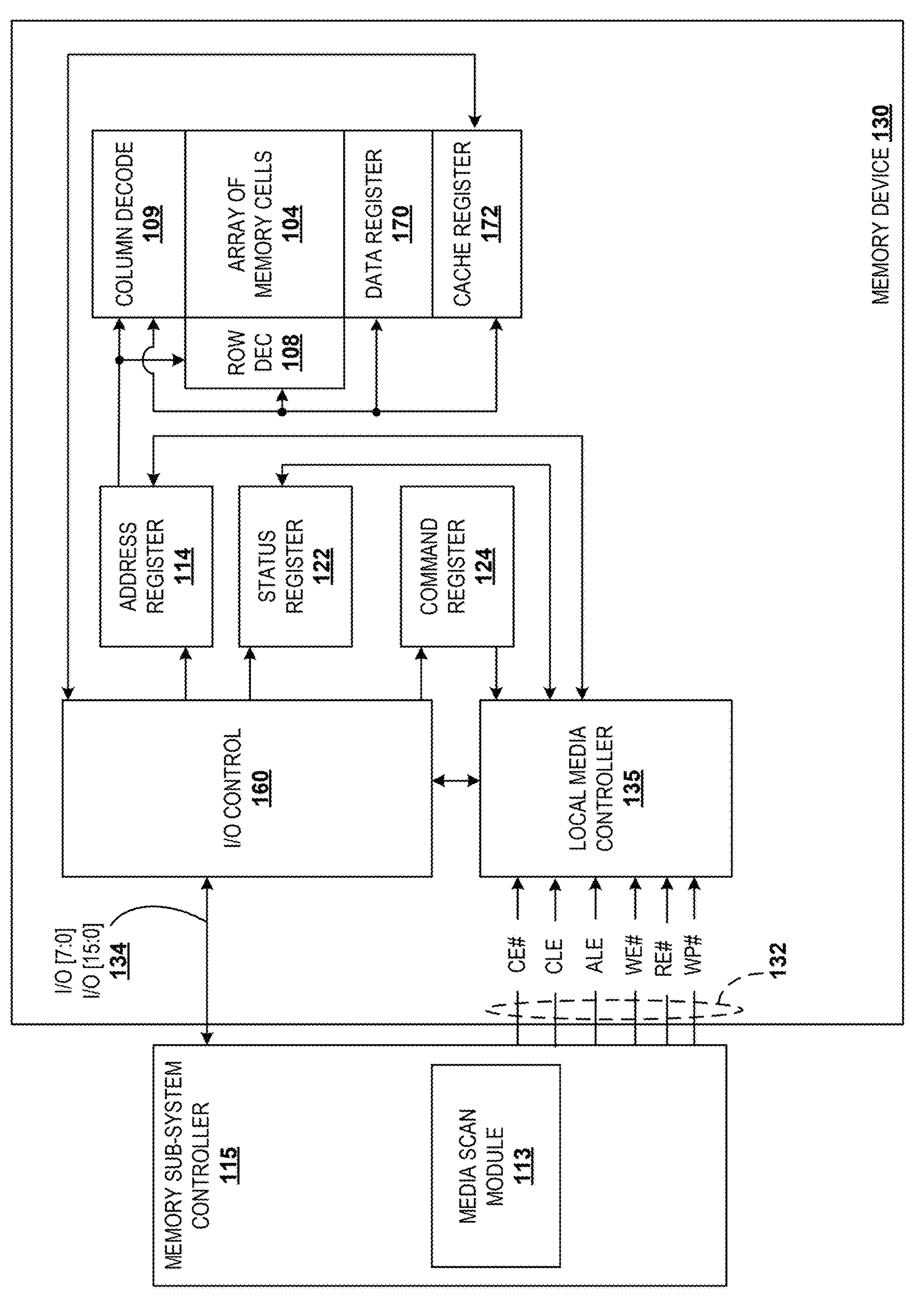
FIG. 1B illustrates a simplified block diagram of an example memory device in communication with a memory sub-system controller.

FIG. 1B illustrates a simplified block diagram of an example of a first apparatus, in the form of a memory device 130, in communication with an example of a second apparatus, in the form of a memory sub-system controller 115 of a memory sub-system (e.g., the memory sub-system 110 of FIG. 1A). Some examples of electronic systems include personal computers, personal digital assistants (PDAs), digital cameras, digital media players, digital recorders, games, appliances, vehicles, wireless devices, mobile telephones, etc. The memory sub-system controller 115 (e.g., a controller external to the memory device 130), can be a memory controller or other external host device.

The memory device 130 includes an array of memory cells 104 logically arranged in rows and columns. As an example, the memory cells 104 can be arranged in an assortment of multiple blocks, with each block including a set of sub-blocks. The blocks/sub-blocks are grouped together to form the planes 106 of the memory device 130. The memory cells 104 form a non-transitory computer-readable medium. Memory cells of a logical row are connected to the same access line (e.g., a wordline) while memory cells of a logical column are selectively connected to the same data line (e.g., a bit line) in some examples. In some examples, a single access line is associated with more than one logical row of memory cells and a single data line may be associated with more than one logical column. Memory cells of at least a portion of the array of memory cells 104 are capable of being programmed to one of at least two target data states.

The memory device 130 includes row decode circuitry 108 and column decode circuitry 109 for decoding address signals. Address signals are received and decoded to access an array of memory cells 104 of the memory device 130. The memory device 130 also includes input/output (I/O) control circuitry 160 to manage input of commands, addresses and data to the memory device 130 as well as output of data and status information from the memory device 130. The memory device 130 has an address register 114 and is in communication with the I/O control circuitry 160, the row decode circuitry 108 and the column decode circuitry 109 to latch the address signals prior to decoding. The memory device 130 also includes a command register 124 in communication with the I/O control circuitry 160 and a local media controller 135 to latch incoming commands.

A controller (e.g., the local media controller 135 internal to the memory device 130) controls access to the array of memory cells 104 in response to the commands and generates status information for the external memory sub-system controller 115. For example, the local media controller 135 is configured to perform access operations (e.g., read operations, programming operations and/or erase operations) on the array of memory cells 104. The local media controller 135 is in communication with the row decode circuitry 108 and the column decode circuitry 109 to control the row decode circuitry 108 and the column decode circuitry 109 in response to the addresses.

As described above in the example of FIG. 1A, the media scan module 113 can implement a media scan operation on the memory cells 104 of the memory device 130. The media scan operation can include selecting a proper subset of the codewords of a page of the memory device 130. As described above, the BEC of the selected codeword(s) can be compared with one or more BEC thresholds to determine if the data stored in the page of the memory device 130 should be folded or not.

The local media controller 135 is also in communication with a cache register 172. The cache register 172 latches data, either incoming or outgoing, as directed by the local media controller 135 to temporarily store data while the array of memory cells 104 is busy writing or reading, respectively, other data. During a programming operation (e.g., write operation), data is passable from the cache register 172 to the data register 170 for transfer to the array of memory cells 104, and new data can be latched in the cache register 172 from the I/O control circuitry 160. During a read operation, data is passable from the cache register 172 to the I/O control circuitry 160 for output to the memory sub-system controller 115. New data is passable from the data register 170 to the cache register 172. The cache register 172 and/or the data register 170 form (e.g., or form a portion of) a page buffer of the memory device 130. The page buffer includes sensing devices (not shown in FIG. 1B) to sense a data state of a memory cell of the array of memory cells 104. For example, the sensing devices sense a state of a data line connected to that memory cell. The memory device 130 also includes a status register 122 in communication with the I/O control circuitry 160 and the local media controller 135 to latch the status information for output to the memory sub-system controller 115.

The memory device 130 receives control signals at the memory sub-system controller 115 from the local media controller 135 over a control link 132. For example, the control signals can include a chip enable signal CE #, a command latch enable signal CLE, an address latch enable signal ALE, a write enable signal WE #, a read enable signal RE # and/or a write protect signal WP #. Additional or alternative control signals (not shown) can be further received over control link 132 depending upon the nature of the memory device 130. In some examples, the memory device 130 receives command signals (which represent commands), address signals (which represent addresses) and data signals (which represent data) from the memory sub-system controller 115 over a multiplexed input/output (I/O) bus 134 and outputs data to the memory sub-system controller 115 over the I/O bus 134.

In some examples, the commands are received over input/output (I/O) pins [7:0] of the I/O bus 134 at I/O control circuitry 160 and may then be written into the command register 124. The addresses are received over input/output (I/O) pins [7:0] of the I/O bus 134 at I/O control circuitry 160 and written into the address register 114. The data is receivable over input/output (I/O) pins [7:0] for an 8-bit device or input/output (I/O) pins [15:0] for a 16-bit device at I/O control circuitry 160 and is writable into the cache register 172. The data is subsequently written into the data register 170 for programming the array of memory cells 104 in some examples.

In some examples, the cache register 172 is omitted, and in such examples, the data is written directly into the data register 170. Additionally, or alternatively, data is output over input/output (I/O) pins [7:0] for an 8-bit device or input/output (I/O) pins [15:0] for a 16-bit device. Moreover, it is noted that although reference is made to I/O pins, in other examples, a different conductive node providing for electrical connection to the memory device 130 by an external device (e.g., the memory sub-system controller 115), such as conductive pads or conductive bumps could be used in addition to or as a replacement for the I/O pins.

The example memory device 130 of FIG. 1B has been simplified. Moreover, in other examples, the functionality of the various block components described with reference to FIG. 1B are not segregated to distinct components or component portions of an integrated circuit device. For example, a single component or component portion of an integrated circuit device could be adapted to perform the functionality of more than one block component of FIG. 1B. Alternatively, components or component portions of an integrated circuit device could be combined to perform the functionality of a single block component of FIG. 1B. Additionally, while specific I/O pins are described in accordance with popular conventions for receipt and output of the various signals, it is noted that other combinations or numbers of I/O pins (or other I/O node structures) are useable in various examples.

Figure 2:
FIG. 2 illustrates an example diagram of a set of media scanning parameters.
Figure 2:
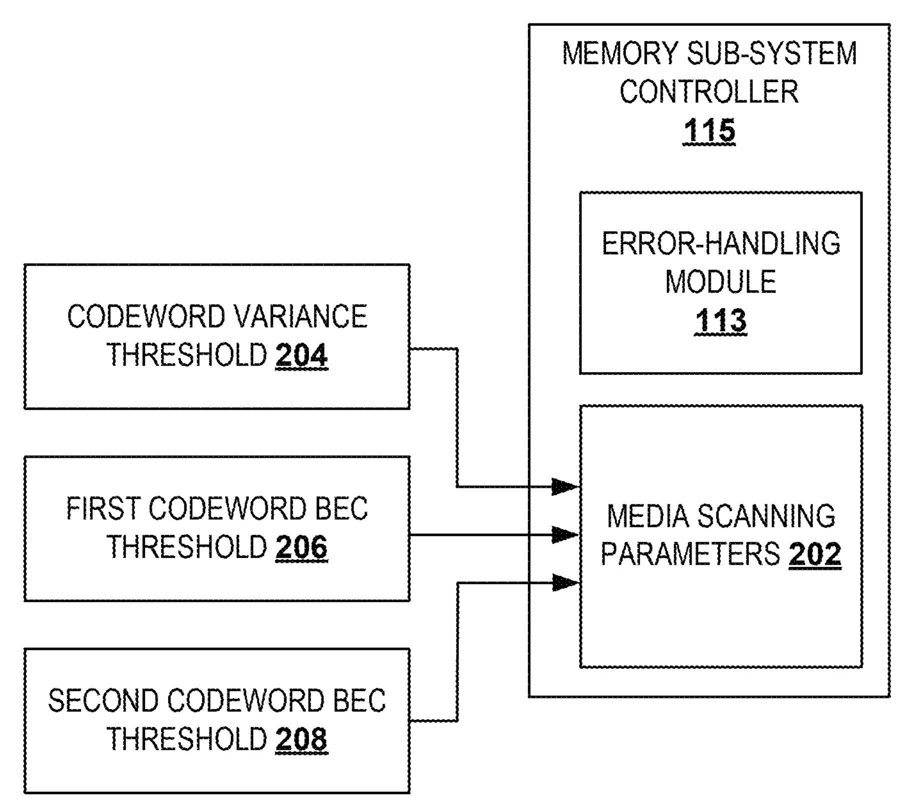

FIG. 2 illustrates an example diagram 200 of a set of media scanning parameters. The diagram 200 demonstrates the memory sub-system controller 115 and the media scan module 113 therein. Additionally, the memory sub-system controller 115 includes media scanning parameters 202 that can be programmed to set the conditions of the media scan operation for facilitating a selective media scan of a page with respect to operating the media scan operation for a proper subset (e.g., one) codeword of a page of the memory device 130.

The media scanning parameters 202 can be stored in the local memory 119, or can be accessed from another memory device. As an example, the media scanning parameters 202 can be programmed and/or provided to the memory sub-system controller 115 via user inputs and/or an external device. During a media scan operation, the media scan module 113 can access the media scanning parameters 202 to facilitate selection of the one or more codewords of the respective page, and to determine conditions for performing a fold of the data in the portion of the memory device 130 that includes the page (e.g., a block or block stripe).

In the example of FIG. 2, the media scanning parameters 202 include a codeword variance threshold 204 that can define a threshold for selecting one or more of the codewords as the proper subset of all of the codewords of the page of the memory device 130. As one example, each page that is scanned in a media scan operation can include four codewords, and the media scan module 113 can be configured to select a single one of the codewords for the media scan. The selection can be based on a relative reliability of the codewords, such as determined from testing of the memory device 130 or from testing multiple instances/lots of the memory device 130 during fabrication. The testing of the memory device(s) 130 (e.g., wafer testing, package testing) can indicate a relative reliability of different portions of the memory device(s) (e.g., wordlines in each page of the memory device 130). The relative reliability can thus be quantified and provided as reliability data with respect to specific portions of the memory device 130. For example, the reliability data can correspond to an expected BEC of data stored in the respective wordlines of a given page, with the expected BEC being based on testing (e.g., an aggregate/average/probabilistic BEC associated with test data). The reliability data can thus provide a useful indication of a relative reliability of the wordlines of a given page, and thus of the codewords stored in the respective page.

The codeword variance threshold 204 can thus be a threshold against which the quantified reliability of the reliability data associated with specific memory locations can be compared. In the example above of the reliability data corresponding to an expected BEC of data in specific wordlines, the expected BEC can be compared with the codeword variance threshold 204. For example, the codeword variance threshold 204 can correspond to a quantity of expected BEC of a greatest difference between any two wordlines in a given page. If the greatest expected BEC difference between any two wordlines in a given page is greater than the codeword variance threshold 204, then the media scan module 113 selects the codeword having the highest expected BEC (and is thus the least reliable) for the media scan of the page. However, if there is no outlier codeword, and thus the greatest expected BEC difference between any two wordlines in a given page is less than the codeword variance threshold 204, the media scan module 113 selects the codeword at random from the codewords of the page.

The selected codeword is thus implemented for the media scan by the media scan module 113. For example, the media scan module 113 determines the actual BEC of the selected codeword and compares the actual BEC with one or more BEC thresholds to determine whether or not to fold the data, as described in greater detail herein. While the example above describes selection of one codeword from a page of four codewords, other example implementations are possible. For example, the media scan module 113 can select more than one codeword as a proper subset of the codewords of the page, and the page can include more or fewer than four codewords.

The predefined media scanning parameters 202 can also include a first BEC threshold 206. The first BEC threshold 206 can correspond to a BEC threshold against which the BEC of the selected codeword(s) is compared. As an example, the first BEC threshold 206 can be less than a BEC threshold of typical media scan operations against which the BEC of all codewords is compared. For example, the first BEC threshold 206 can have a BEC value that is between approximately 70 and approximately 90 bit errors.

The predefined media scanning parameters 202 can further include a second BEC threshold 208. The second BEC threshold 208 can correspond to a BEC threshold against which the BEC of each of the codewords of the page is compared. The comparison of the BEC of each of the codewords of the page can occur in response to the selected codeword(s) having a BEC that is greater than the first BEC threshold 206. As an example, the second BEC threshold 208 can be similar to or approximately the same as a BEC threshold of typical media scan operations against which the BEC of all codewords is compared. The second BEC threshold 208 can thus be greater than the first BEC threshold 206. For example, the second BEC threshold 208 can have a BEC value that is between approximately 110 and approximately 190 bit errors.

Figure 3:
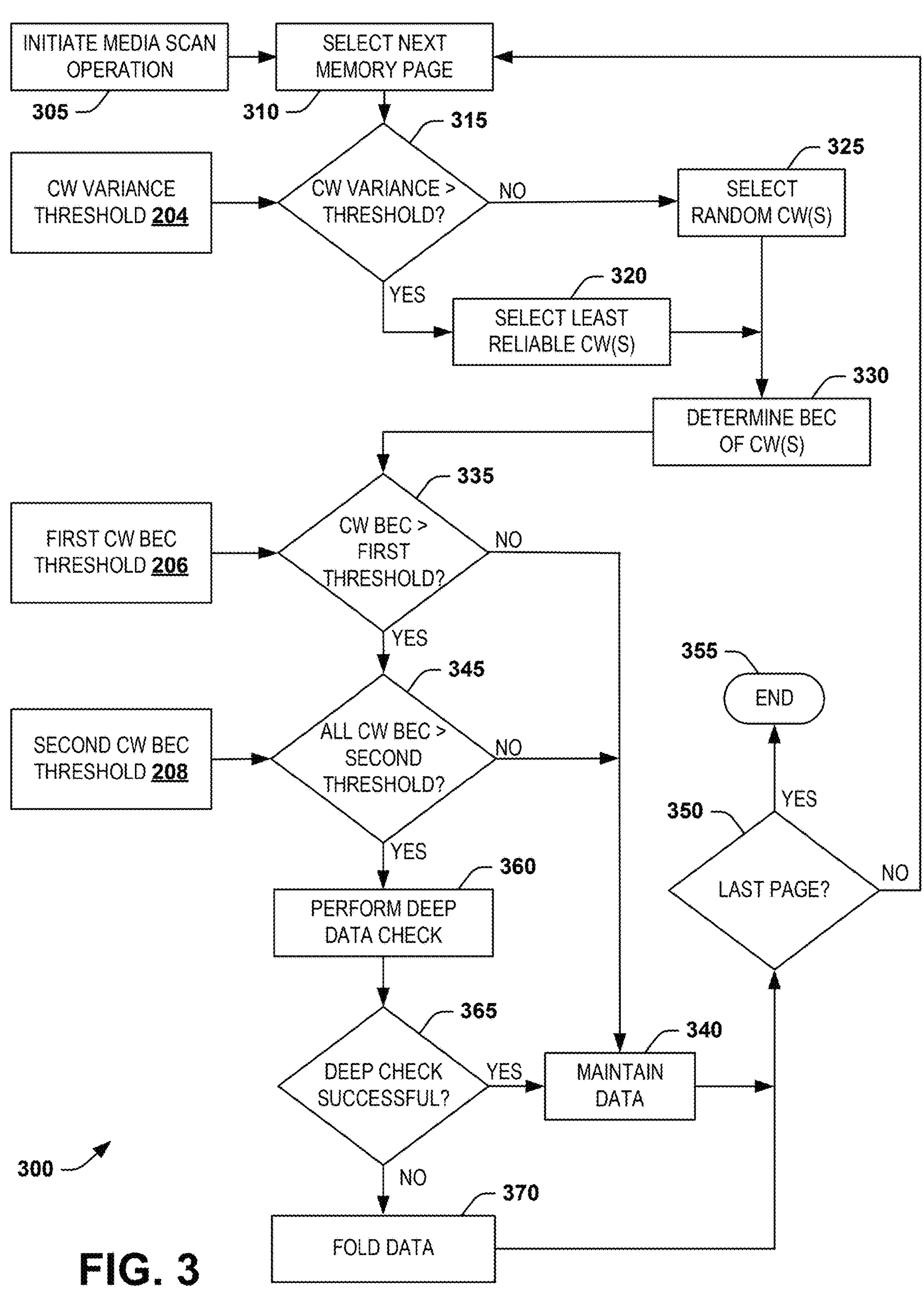
FIG. 3 illustrates an example flow diagram of a method of performing a media scan operation.

FIG. 3 illustrates a flow diagram of a method 300 of performing a media scan operation (e.g., the memory device 130). The method 300 can be implemented, for example, by a controller, such as the memory sub-system controller 115 (e.g., the media scan module 113) of the system 100 of FIG. 1A. The method 300 can thus correspond to the media scan operation described herein. The method begins at block 305, in which the controller initiates a media scan operation. The method then proceeds to block 310.

At block 310, the media scan module 113 selects a next page of the memory device 130 for performing a media scan of the media scan operation. If the method 300 arrived at block 310 from block 305, then the next page of the memory device 130 is the first page of the memory device 130 on which the media scan is implemented. The method 300 then proceeds to block 315. At block 315, a determination is made as to whether a codeword (abbreviated "CW" in the example of FIG. 3) variance is greater than the codeword variance threshold 204, as provided from the media scanning parameters 202. For example, as described above, the codeword variance can be based on a relative expected BEC of the codewords in the page, such as determined from testing of the memory device 130 or multiple instances of the memory device 130 during fabrication. In this example, if the greatest expected BEC difference between any two codewords is greater than the codeword variance threshold 204, then the determination is positive. If the determination at block 315 is positive (e.g., YES), the method 300 proceeds to block 320. If the determination at block 315 is negative (e.g., NO), then the method 300 proceeds to block 325.

At block 320, having determined that the codeword variance is greater than the codeword variance threshold 204, the media scan module 113 selects the least reliable one or more codeword(s) (e.g., one codeword) of the page. For example, the media scan module 113 can select the codeword(s) having the highest expected BEC. At block 325, having determined that the codeword variance is less than the codeword variance threshold 204, the media scan module 113 selects one or more codeword(s) (e.g., one codeword) of the page at random. From block 320 or block 325, the method 300 then proceeds to block 330.

At block 330, the media scan module 113 determines the BEC of the selected codeword(s). As an example, the media scan module 113 can implement ECC capability or can access/cooperate with an ECC controller to determine the BEC of the selected codeword(s). The method 300 then proceeds to block 335. At block 335, a determination is made as to whether the determined BEC of the selected codeword(s) is greater than the first BEC threshold 206, as provided from the media scanning parameters 202. If any one of the selected codeword(s) has a BEC greater than the first BEC threshold 206, then the determination is positive. If the determination at block 335 is negative (e.g., NO), the method 300 proceeds to block 340. If the determination at block 335 is positive (e.g., YES), then the method 300 proceeds to block 345.

At block 340, having determined that none of the selected codeword(s) has a BEC greater than the first BEC threshold 206, the media scan module 113 maintains the data in the page based on the page being considered reliable, and thus determines that a fold of the data in the page is not necessary. The method 300 then proceeds to block 350, at which a determination is made as to whether the page that was selected in block 310 is the last page of the entire media scan operation. If the determination at block 350 is positive (e.g., YES), then the method 300 proceeds to block 355, at which the media scan operation is concluded. If the determination at block 350 is negative (e.g., NO), the method 300 proceeds back to block 310, at which a next block in the media scan operation is selected for a scan.

At block 345, having determined that one or more of the selected codeword(s) has a BEC greater than the first BEC threshold 206, the media scan module 113 determines whether the determined BEC of any of the codewords of the page is greater than the second BEC threshold 208, as provided from the media scanning parameters 202. As described above, the second BEC threshold 208 can be greater than the first BEC threshold 206. The determination of the BEC of all of the codewords can have occurred prior to block 345, such as at block 330 or after the positive determination at block 335. If any one of the codewords of the page has a BEC greater than the second BEC threshold 208, then the determination is positive. If the determination at block 345 is negative (e.g., NO), the method 300 proceeds to block 340, at which the media scan module 113 maintains the data in the page based on the page being considered reliable, as described above. If the determination at block 345 is positive (e.g., YES), then the method 300 proceeds to block 360.

At block 360, the media scan module 113 performs a deep check (e.g., valley health check) of the data. The method 300 then proceeds to block 365, at which a determination is made as to whether the deep check is successful. If the determination at block 365 is positive (e.g., YES), then the method 300 proceeds to block 340, at which the media scan module 113 maintains the data in the page based on the page being considered reliable, as described above. If the determination at block 365 is negative (e.g., NO), the method 300 proceeds to block 370. At block 370, the media scan module 113 folds the data in the page, or in a section of the memory device 130 that includes the page. As an example, the media scan module 113 can fold a block or a block stripe that includes the page to a different portion of the memory device 130. The method the proceeds to block 350, at which the determination is made as to whether the page that was selected in block 310 is the last page of the entire media scan operation.

Figure 4:
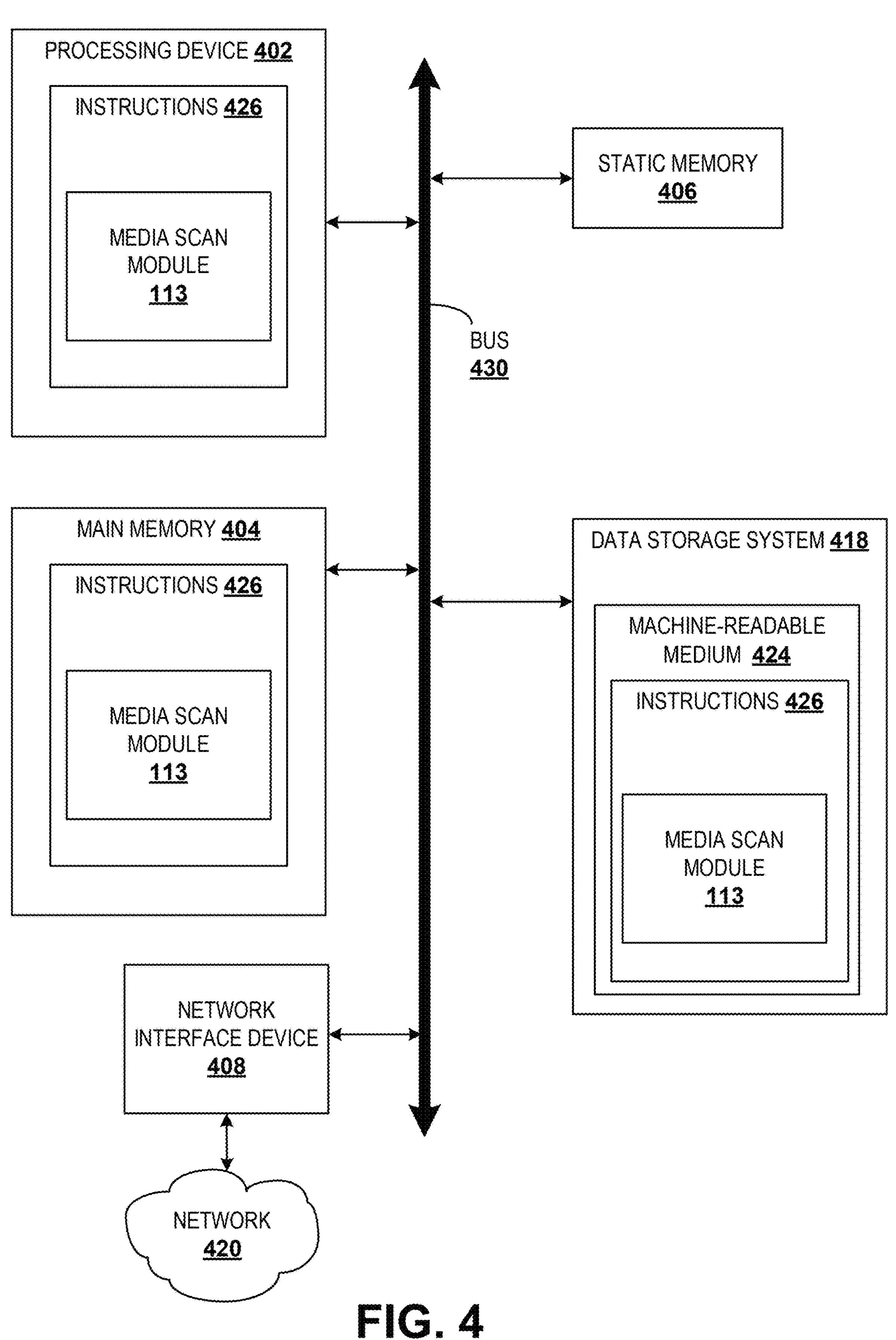
FIG. 4 illustrates an example of a computer system in which examples of the present description may operate.

FIG. 4 illustrates an example machine of a computer system 400 (a machine) within which a set of instructions, for causing the machine to perform any one or more of the methodologies discussed herein, can be executed. In some examples, the computer system 400 corresponds to a host system (e.g., the host system 120 of FIG. 1A) that includes, is coupled to, or utilizes a memory sub-system (e.g., the memory sub-system 110 of FIG. 1A) or is used to perform the operations of a controller (e.g., to execute an operating system to perform operations corresponding to the media scan module 113 of FIG. 1A). In other examples, the machine is connected (e.g., networked) to other machines in a LAN, an intranet, an extranet and/or the Internet. In various examples, the machine operates in the capacity of a server or a client machine in client-server network environment, as a peer machine in a peer-to-peer (or distributed) network environment or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge or any machine capable of executing a set of instructions (sequential or otherwise) that specify actions to be taken by that machine. In other examples, the machine may be a computer within an automotive application, a data center, a smart factory, or other industrial application. Further, while a single machine is illustrated, the term "machine" shall also be taken to include any collection of machines that individually or jointly execute a set (or multiple sets) of instructions to perform the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM) or other non-transitory computer-readable media) and a data storage system 418, which communicate with each other via a bus 430.

The processing device 402 represents one or more general-purpose processing devices such as a microprocessor, a central processing unit, etc. More particularly, the processing device 402 can be a complex instruction set computing (CISC) microprocessor, reduced instruction set computing (RISC) microprocessor, very long instruction word (VLIW) microprocessor or a processor implementing other instruction sets or processors implementing a combination of instruction sets. In some examples, the processing device 402 is implemented with a special-purpose processing devices such as an application specific integrated circuit (ASIC), a field programmable gate array (FPGA), a digital signal processor (DSP), network processor, etc. The processing device 402 is configured to execute instructions 426 for performing the operations discussed herein. In some examples, the computer system 400 includes a network interface device 408 to communicate over the network 420.

The data storage system 418 includes a machine-readable storage medium 424 (also known as a computer-readable medium) that store sets of instructions 426 or software for executing the methodologies and/or functions described herein. The machine-readable storage medium 424 is a non-transitory medium. The instructions 426 can also reside, completely or at least partially, within the main memory 404 and/or within the processing device 402 during execution thereof by the computer system 400, the main memory 404 and the processing device 402 also constituting machine-readable storage media. The machine-readable storage medium 424, data storage system 418 and/or main memory 404 can correspond to the memory sub-system 110 of FIG. 1A. Accordingly, the machine-readable storage medium 424, the data storage system 418 and/or the main memory 404 are examples of non-transitory computer-readable media.

In some examples, the instructions 426 include instructions to implement functionality corresponding to the media scan module 113 of FIG. 1A. As an example, the instructions can include selecting one or more codewords as a proper subset of all of the codewords of a page for a media scan and comparing the BEC of the selected codeword(s) with one or more BEC thresholds to determine whether to fold the data stored in the respective memory device. While the machine-readable storage medium 424 is shown in an example to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared and otherwise manipulated. It has proven convenient at times, principally for reasons of common usage, to refer to these signals as bits, values, elements, symbols, characters, terms, numbers, etc.

It is noted, however, that all of these and similar terms are to be associated with the appropriate physical quantities and are merely convenient labels applied to these quantities. This description can refer to the action and processes of a computer system or similar electronic computing device that manipulates and transforms data represented as physical (electronic) quantities within the computer system's registers and memories into other data similarly represented as physical quantities within the computer system memories or registers or other such information storage systems.

This description also relates to an apparatus for performing the operations herein. This apparatus can be specially constructed for the intended purposes or this apparatus can include a general purpose computer selectively activated or reconfigured by a computer program stored in the computer. Such a computer program can be stored in a computer readable storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards or any type of media suitable for storing electronic instructions, each coupled to a computer system bus.

The algorithms and displays presented herein are not inherently related to any particular computer or other apparatus. Various general purpose systems can be used with programs in accordance with the descriptions herein, or it can prove convenient to construct a more specialized apparatus to perform the method. In addition, the present disclosure is not described with reference to any particular programming language. It will be appreciated that a variety of programming languages can be used to implement the teachings of the disclosure as described herein.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications and variations that fall within the scope of this application, including the appended claims. As used herein, the term "includes" means includes but not limited to, the term "including" means including but not limited to. The term "based on" means "based at least in part on". Additionally, where the disclosure or claims recite "a," "an," "a first" or "another" element, or the equivalent thereof, it should be interpreted to include one or more than one such element, neither requiring nor excluding two or more such elements.

What is claimed is:

1. A method for performing a media scan operation in a memory device, the method comprising:

- selecting a set of codewords that are a proper subset of a plurality of codewords in a page of memory via a controller, wherein selecting the set of codewords comprises:
  - selecting one or more codewords based on predetermined codeword reliability data generated from fabrication testing of one or more instances of the memory device;
  - comparing a variance of the predetermined codeword reliability data with a codeword variance threshold;
  - selecting one of the codewords of the page of memory having a defined unreliability based on the predetermined codeword reliability data that is greater than a defined unreliability of a remaining set of the codewords of the page of memory in response to the variance of the predetermined codeword reliability data meeting or exceeding the codeword variance threshold; and
  - randomly selecting one of the codewords of the page of memory in response to the variance of the predetermined codeword reliability data being less than the codeword variance threshold;
- determining a bit error count (BEC) of each of the selected set of codewords via the controller;
- comparing the BEC of each of the set of codewords with a first BEC threshold via the controller;

determining the BEC of each of the codewords of the page of memory via the controller in response to the BEC of one or more of the selected set of codewords being greater than the BEC threshold;

comparing the BEC of each of the codewords of the page of memory with a second BEC threshold with the controller in response to the BEC of one or more of the selected set of codewords being greater than the first BEC threshold; and initiating a deep check of the page of memory via the controller in response to the BEC of one or more of the codewords of the page of memory being greater than the second BEC threshold.

2. The method of claim 1, wherein the first BEC threshold is less than the second BEC threshold.

3. The method of claim 1, further comprising folding the data in at least the page of memory via the controller in response to a failure of the deep check of the page of memory.

4. The method of claim 3, wherein folding the data comprises folding a block stripe of the memory device comprising the page of memory via the controller in response to the failure of the deep check of the page of memory.

5. The method of claim 1, wherein selecting the set of codewords comprises selecting one codeword in the page of memory via the controller.

6. A system for performing a media scan operation in a memory device, comprising:

the memory device; and a processing device coupled to the memory device, the processing device to perform operations comprising:

selecting a set of codewords that are a proper subset of a plurality of codewords in a page of memory, wherein selecting the set of codewords comprises:

selecting one or more codewords based on predetermined codeword reliability data generated from fabrication testing of one or more instances of the memory device;

comparing a variance of the predetermined codeword reliability data with a codeword variance threshold;

selecting one of the codewords of the page of memory having a defined unreliability that is greater than a defined unreliability of a remaining set of the codewords of the page of memory in response to the variance of the predetermined codeword reliability data meeting or exceeding the codeword variance threshold; and randomly selecting one of the codewords of the page of memory in response to the variance of the predetermined codeword reliability data being less than the codeword variance threshold;

determining a bit error count (BEC) of each of the selected set of codewords;

comparing the BEC of each of the set of codewords with a first BEC threshold;

determining the BEC of each of the codewords of the page of memory in response to the BEC of one or more of the selected set of codewords being greater than the BEC threshold;

comparing the BEC of each of the codewords of the page of memory with a second BEC threshold in response to the BEC of one or more of the selected set of codewords being greater than the first BEC threshold; and initiation a deep check of the page of memory in response to the BEC of one or more of the codewords of the page of memory being greater than the second BEC threshold.

7. The system of claim 6, further comprising folding the data in at least the page of memory in response to a failure of the deep check of the page of memory.

8. A non-transitory computer-readable storage medium comprising instructions that, when executed by a processing device, cause the processing device to perform a media scan operation, the media scan operation comprising:

selecting a set of codewords that are a proper subset of a plurality of codewords in a page of memory, wherein selecting the set of codewords comprises:

selecting one or more codewords based on predetermined codeword reliability data generated from fabrication testing of one or more instances of the memory device;

comparing a variance of the predetermined codeword reliability data with a codeword variance threshold;

selecting one of the codewords of the page of memory having a defined unreliability that is greater than a defined unreliability of a remaining set of the codewords of the page of memory in response to the variance of the predetermined codeword reliability data meeting or exceeding the codeword variance threshold; and randomly selecting one of the codewords of the page of memory in response to the variance of the predetermined codeword reliability data being less than the codeword variance threshold;

determining a bit error count (BEC) of each of the selected set of codewords;

comparing the BEC of each of the set of codewords with a first BEC threshold;

determining the BEC of each of the codewords of the page of memory in response to the BEC of one or more of the selected set of codewords being greater than the first BEC threshold;

comparing the BEC of each of the codewords of the page of memory with a second BEC threshold in response to the BEC of one or more of the selected set of codewords being greater than the first BEC threshold; and initiation a deep check of the page of memory in response to the BEC of one or more of the codewords of the page of memory being greater than the second BEC threshold.

9. The medium of claim 8, further comprising folding the data in at least the page of memory in response to a failure of the deep check of the page of memory.

10. The medium of claim 8, wherein selecting the set of codewords comprises selecting the one or more codewords that is the proper subset of the codewords in the page of memory based on predetermined codeword reliability data.

* * * * *